United States Patent [19]
Parsons

[11] 3,831,159
[45] Aug. 20, 1974

[54] HIGH LEVEL AND LOW LEVEL ALARM FOR BINS AND HOPPERS

[76] Inventor: Ward H. Parsons, 1202 Green Glen Rd., Birmingham, Ala. 35216

[22] Filed: May 2, 1973

[21] Appl. No.: 356,473

[52] U.S. Cl.............................. 340/246, 200/61.21
[51] Int. Cl. .......................................... G08b 21/00
[58] Field of Search.................. 340/246; 200/61.21

[56] References Cited
UNITED STATES PATENTS
3,019,310   1/1962   Hoff................................ 340/246 X
3,114,804   12/1963  Geis................................ 340/246 X FOREIGN PATENTS OR APPLICATIONS
314,867   10/1919   Germany....................... 200/61.21

*Primary Examiner*—John W. Caldwell
*Assistant Examiner*—Daniel Myer
*Attorney, Agent, or Firm*—B. P. Fishburne, Jr.

[57] ABSTRACT

A bin level monitoring device such as a tilt switch is suspended eccentrically in a storage bin or hopper for particulate material which is discharged from the bottom of the bin either at the center or the side thereof. The monitoring device is contained near the top of a downwardly flaring tube body whose length is determined by the height of the bin and the desired high and low level points to be monitored. Tube body functions with relation to the rising and falling level of the material in the bin to enable a single level monitoring or sensing device to properly detect both conditions in a very accurate manner.

6 Claims, 9 Drawing Figures

PATENTED AUG 20 1974 3,831,159
SHEET 1 OF 2
FIG.1 FIG.2
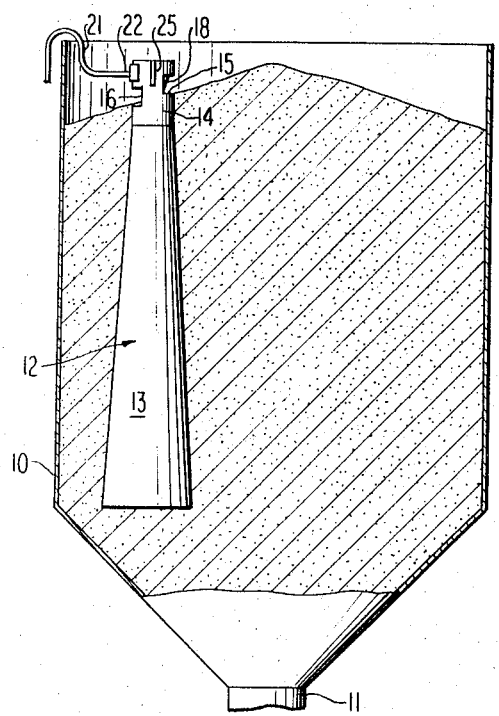
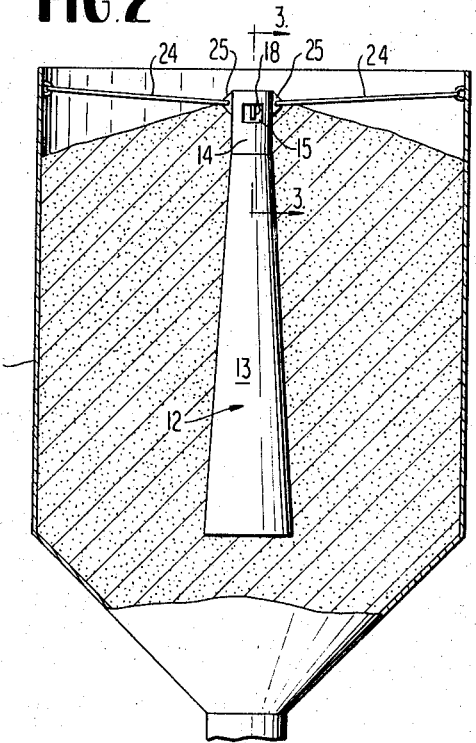
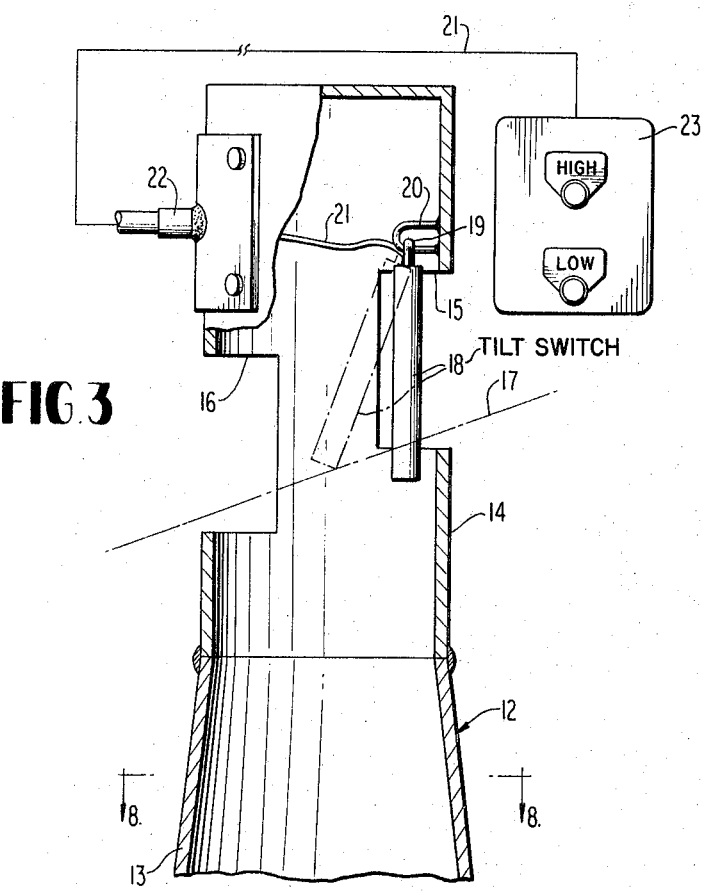
FIG.3
FIG.8
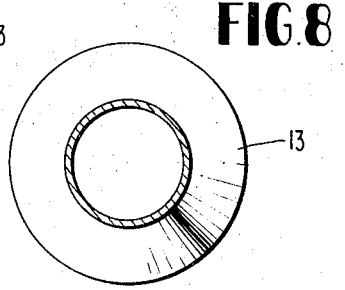
FIG.9
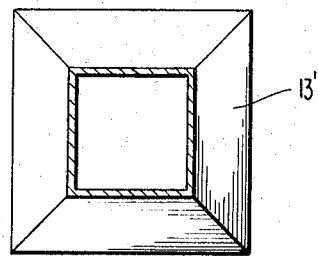

HIGH LEVEL AND LOW LEVEL ALARM FOR BINS AND HOPPERS

BACKGROUND OF THE INVENTION

A variety of devices both mechanical and electrical are known in the prior art for detecting and signalling the existence of a high level or low level condition of material in a bin or hopper. Generally, if it is necessary to monitor both conditions, two separate devices will be required for producing separate alarm signals. Additionally, in connection with known prior art devices for this purpose, such devices tend to be quite inefficient when used to monitor the bin level of certain materials such as wet sand which exhibits a marked bridging effect in the bin or hopper and clings to the sidewalls thereof, thereby causing the level detecting device to render a faulty indication or signal. Because of this problem and the recognized limitations of the prior art devices, there is at the present time a definite need for a more efficient and reliable economical means for detecting and signalling both the high and low levels of materials in bins including those materials which cling to and bridge the sidewalls of the bins in which they are stored. In addition to wet sand, other materials including kaolin, pulverized marble and bentonite exhibit this characteristic.

This particular problem is very effectively dealt with by the present invention so that the desired high and low levels of these materials as well as many others may be accurately detected in a bin by the use of a single electrical monitoring device such as a probe type tilt switch or a paddle type monitor or certain other similar devices known in the prior art. With the invention there is no need for separate monitoring devices at the high and low level positions in the bin and therefore the overall apparatus is rendered extremely simple and economical.

The invention takes advantage of the known flow and bridging characteristics of certain granular materials and employs a simple flaring tube body in conjunction with a single electrical level indicator or monitor to achieve the desired purpose of accurately detecting and signalling both the high and low levels of the material in the bin or hopper without regard for the tendency of the material to cling to the sidewalls or to be free flowing, as the case may be. The flared tube functions in conjunction with the level detector to cause the latter to first sense and signal the high level condition in the bin and then only after the material has receded to the true low level to produce a second signal indicative of such low level and to do this in a consistent, uniform and very accurate manner. The flared tube, in effect, provides a consistent time delay function with respect to the electrical level detector so that a single detector will have the ability to first signal the high level condition and then after a specified time due to the action of the tube, to signal the low level condition in the bin.

Other features and advantages of the invention will be apparent to those skilled in the art during the course of the following description, taken in conjunction with the accompanying drawings forming a part of the application.

BRIEF DESCRIPTION OF THE DRAWING FIGURES

FIG. 1 is a central vertical section through a typical center discharge bin for granular material equipped with a high and low level indicator or alarm embodying the invention.

FIG. 2 is a similar view of the invention and bin taken at right angles to FIG. 1.

FIG. 3 is an enlarged fragmentary partly diagrammatic view taken on line 3—3 of FIG. 2.

FIG. 8 is a horizontal cross section through a conical tube utilized in the invention.

FIG. 9 is a similar sectional view through a flared tube which is square in cross section.

DETAILED DESCRIPTION OF PREFERRED EMBODIMENT

Figure 7:
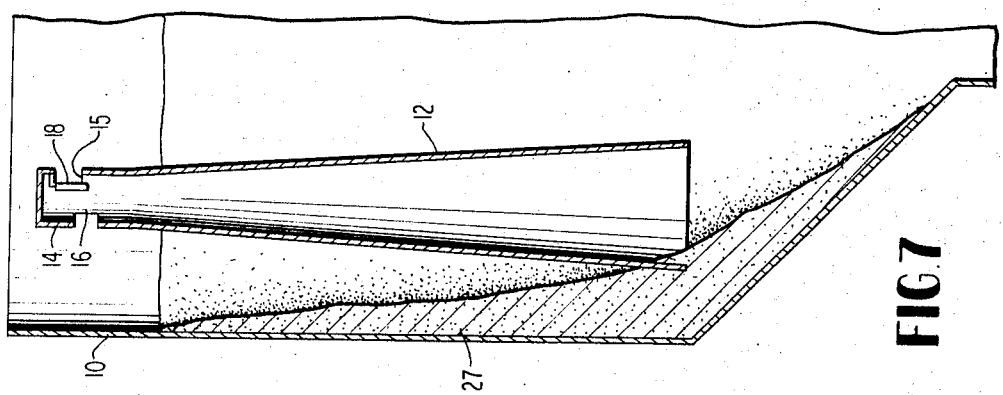
FIG. 7 is a similar view showing the bin and flared tube empty to deactivate the indicator device for signalling the required low level condition of the bin.

Referring to the drawings in detail, wherein like numerals designate like parts, the numeral 10 designates a storage bin for wet sand or the like which in the embodiment shown is discharged through a central opening means 11 at the bottom of the bin and is introduced into the top of the bin by any conventional handling means. It should be mentioned that the invention is equally applicable to a side discharge bin and to bins or hoppers which vary in shape, depth and width. The outlet means 11 is equipped with suitable gating means, not shown, to regulate the discharge of the material. While wet sand has been mentioned as the material in the bin 10, it should also be explained that the invention has full utility with a wide variety of particulate materials both wet and dry. Wet sand has been emphasized because this is one of the most difficult materials to handle in terms of monitoring its levels due to its bridging tendency between the walls of the bin and its tendency to cling to the vertical walls. This tendency makes it very difficult for known prior art devices to reliably detect or indicate high and low levels of sand and certain similar materials.

With continued reference to the drawings, the high and low level monitoring device embodying the invention is designated in its entirety by the numeral 12. This device comprises an elongated tube body 13 which is gradually flared toward its lower open end. The length of the tube body 13 is a variable, depending upon the height of the bin and the high and low level limits to be maintained therein. As indicated in FIG. 8, the tube body may be in the form of a gradually tapering truncated cone. However, as shown in FIG. 9, and indicated therein by the numeral 13', the tube body may be square in cross section or any other polygonal shape embodying a plurality of flat sidewalls. The only requirement is that the tube body should be flared toward its lower end to compensate for the clinging or bridging effect of the material in the bin as will be further described.

Rigidly secured to the open top of the flared tube body 13 is a relatively short, preferably cylindrical housing section 14 having a pair of relatively large vertically staggered sidewall openings 15 and 16, whose respective elevations establish an angle indicated by the broken line 17 in FIG. 3 which is indicative of the natural angle of repose of the particular material in the bin, such as sand. These two openings 15 and 16 extend around major portions of the circumference of the housing 14 to enable the material in the bin to freely enter the housing and the tube body 12 when the level of the material reaches the high level or full bin point. The material can also flow through the housing 14 from side to side thereof by means of the openings 15 and 16. The open interior of the housing 14 is in direct communication with the top of the flared tube 12, as shown.

Within the housing 14, preferably adjacent to the material inlet opening 15 is mounted a material level detecting an indicating device of any preferred conventional type. For the sake of illustration, a tilt switch 18 is shown suspended by a hanger loop 19 from an eye 20 fixed to the sidewall of housing 14 immediately above the opening 15. The tilt switch 18 is freely swingably suspended in this manner inside of the housing. The tilt switch may be of a type manufactured and sold by Ramsey Engineering Company, 1853 West County Road, C, St. Paul, Minn. 55113 as Model No. 20–30 or 20–31 under U.S. Pat. No. 3,114,408. Various other equivalent level monitoring devices could be employed including diaphragms, rotating paddles, differential pressure devices and the like.

As shown in FIG. 3, tilt switch 18 includes a cable 21 extending through an outlet 22 on the housing 14 and leading to and electrically connected with any suitable high and low level indicator means 23, such as a visual indicator or an audible indicator or alarm. For the sake of illustration, the indicator 23 is disclosed as a visual indicator having high and low level lights which may be of different colors. Various arrangements may be employed.

The entire apparatus thus far described is positioned vertically in the bin 10 eccentrically and in spaced relation to the bin sidewall and above the sloping bottom wall thereof. The assembly is supported in this position by wires or rods 24 connected to lugs 25 on the housing 14 and also secured to the bin sidewall as shown in FIG. 2. Various other supporting arrangements could be employed, either of a rigid type or yielding type, and the particular mounting means for the assembly is not a critical part of the invention.

It should be understood that when the indicating tilt switch 18 is in a free hanging vertical position as shown in solid lines in FIG. 3, one indication will be given on the device 23, namely the low level indicator. When the switch is tilted by the rising material in the bin to a position such as shown in broken lines in FIG. 3, a second indication will appear on the device 23, namely the high level indication.

OPERATION

Figure 4:
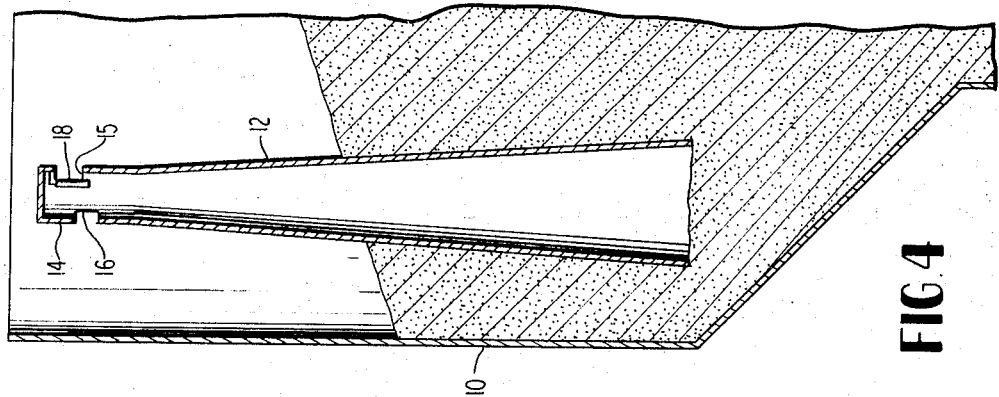
FIG. 4 is a fragmentary vertical section taken through the invention and bin depicting the condition where the bin was filling up and the tube embodied in the invention is empty.

The operational sequence of the apparatus is depicted in drawing FIGS. 4 through 7. Referring first to FIG. 4, the bin 10 is being filled with sand or the like through its open top and the material level has risen well beyond the open bottom of the flared tube 12. The material has sought its natural angle of repose as illustrated. As the material rises above the bottom of the tube 12, it will not enter the tube and the interior of the tube becomes a void.

Figure 5:
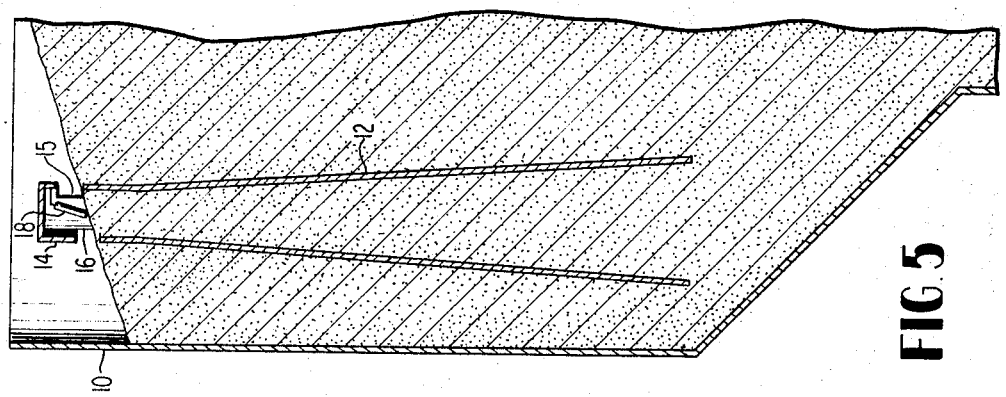
FIG. 5 is a similar view showing the bin full to the high level position and with the high level indicator activated in response to the material filling the tube.

Referring to FIG. 5, when the material in the bin reaches the level of the upper most opening 15, it immediately flows through such openings and into the tube 12, filling the void in the tube. The material is also free to flow out of the opening 16 maintaining its angle of repose and in so doing engages the tilt switch 18 and causes it to become inclined as shown in FIG. 5, thereby initiating an electrical signal which produces the high level indication on the device 23. Responsive to this high level indication or alarm, the flow of material into the bin will be stopped, and this stoppage can be automatic or simply as a result of observation of the indicator 23 by an attendant who will shut off the loading machine when the high level point is reached.

Figure 6:
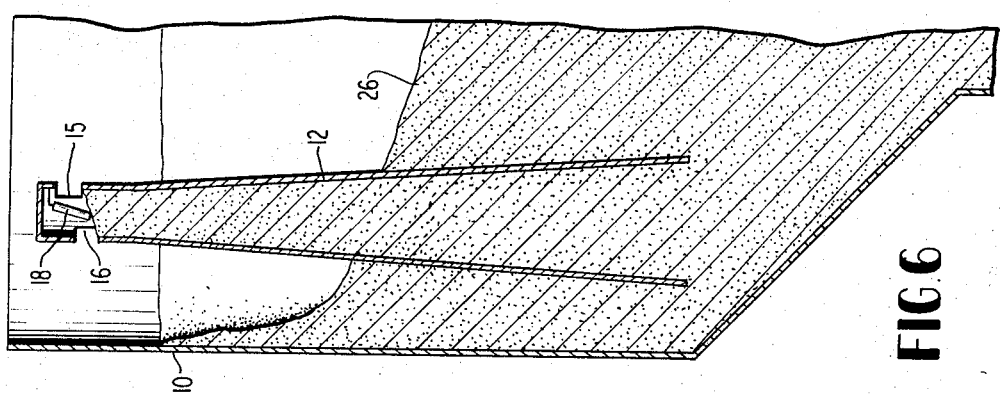
FIG. 6 is a similar view showing the bin emptying but with the material continuing to fill the tube so that the level indicator continues to show the full or high level condition.

Considering FIG. 6, the material in the bin 10 is now being discharged through the bottom of the bin and the level of the material has receded well below the top of the tube 12, and the reverse or concave angle of repose of the material is indicated 26 in FIG. 6. As the material recedes in the bin, the tube 12 will remain filled as long as the material level is above the bottom of the tube. The tilt switch 18 will thus remain tilted and the high level indication on the device 23 will remain constant during this period.

As soon as the level of material in the bin falls below the bottom of the tube 12 as shown in FIG. 7, the tube will be instantly evacuated of all of the material and as this occurs the tilt switch 18 will return to the vertical position which will interrupt the high level indication on the device 23 and initiate the low level indication or alarm. This low level indication will remain constant during the bin filling operation shown in FIG. 4 until the high level condition shown in FIG. 5 is again reached.

The essence of the invention resides in the ability of the flared tube 12 to instantly empty itself of material when the bin level recedes below the open bottom of the tube. In the case of materials like wet sand, it is essential that the tube be flared somewhat toward its lower end to overcome the natural bridging effect of the material in the tube. This bridging effect involves forces exerted by the wet sand against the sidewalls of the tube. If a straight tube were employed in material such as wet sand, would not empty itself reliably from the tube at the low level point. However, with certain free flowing materials of a granular nature, a straight tube will operate satisfactorily. It has also been pointed out that the tube 12 need not be a conical section, but may also be a polygonal tube with downwardly diverging flat sidewalls. In any event, the use of a flared tube allows the material forces operating in a horizontal plane to react on the divergent sidewalls and force the material from the bottom of the truncated tube as soon as the material level reaches the bottom of the tube.

A major feature of the invention is that a single monitoring device, such as the electrical tilt switch 18, may be be employed to produce repeatedly and dependably a high and low level indication under all conditions. For example, a natural build up of the material along the sidewalls of the bin as shown at 27 will not adversely affect the operation the reliability of the apparatus. In the case of certain prior art mechanisms, this build up has tended to render them quite inefficient or altogether useless. The greatly improved efficiency and utility of this invention therefore resides in in unique combination of a material level sensor and indicating system with the associated tube positioned vertically within the bin or hopper to operate as described.

It is to be understood that the form of the invention herewith shown and described is to be taken as a preferred example of the same, and that various changes in the shape, size and arrangement of parts may be resorted to, without departing from the spirit of the invention or scope of the sub-joined claims.

I claim:

1. A high level and low level indicator apparatus for bins or hoppers comprising a vertically elongated gradually downwardly flaring tube body having a bottom open end mounted inside of a hopper eccentrically to the hopper outlet and in spaced relation to hopper side walls, said tube body extending near the top of the hopper and its vertical length establishing a low level for material in the hopper, said tube body having a pair of vertically staggered side wall openings near its top through which material in the hopper may flow into the tube body and fill up the same and may additionally flow through said side wall openings in reaching a natural angle of repose in the hopper, and a single electrical monitoring device disposed in the top portion of the tube body adjacent said staggered side wall openings and responding to the presence or absence of material in said top portion of the tube body and operable to activate a high level and a low level indication means remotely from the tube body.

2. The apparatus as defined in claim 1, and said tube body being conically tapered and resisting filling by granular material in the hopper as the level of such material rises around the tube body toward the top of the tube body, the tube body then filling up with said material by entry of material into the tube body through one of said side wall openings, the tube body resisting discharging the material therein during subsequent receding of the level of the material in said bin to a point sufficiently low to uncover the bottom of the tube body, the tube body then instantly discharging all of the material therein.

3. The apparatus as defined in claim 1, and said monitoring device comprising an electrical tilt responsive switch suspended bodily and freely within the interior of the upper portion of said tube body and adjacent to the uppermost of said vertically staggered openings.

4. The apparatus as defined by claim 1, and said tube body being polygonal in cross section with plural flat side wall portions in divergent relationship along the length of the tube body toward its lower end.

5. The apparatus as defined by claim 1, and a relatively short substantially vertical cylindrical extension on the top of the flaring tube body, said extension being closed at its top, and said pair of vertically staggered side wall openings being formed through said cylindrical extension on diametrically opposite sides thereof, and said single monitoring device comprising an electrical tilt switch suspended for vertical swinging movement inside of said cylindrical extension so as to be in the path of material flowing between said staggered openings and through said extension.

6. The apparatus as defined by claim 5, and said tilt switch being disposed substantially within the uppermost of said side wall openings close to the side wall of said extension and extending substantially across said opening in the vertical direction while free-hanging.

* * * * *